United States Patent
Esser

(10) Patent No.: US 7,241,086 B2
(45) Date of Patent: Jul. 10, 2007

(54) APPARATUS FOR MACHINING PIPE ENDS, ESPECIALLY FOR CUTTING CONNECTING THREADS

(75) Inventor: Karl-Josef Esser, Monchengladbach (DE)

(73) Assignee: SMS Meer GmbH, Monchengladbach (DE)

( * ) Notice: Subject to any disclaimer, the term of this patent is extended or adjusted under 35 U.S.C. 154(b) by 0 days.

(21) Appl. No.: 11/040,616

(22) Filed: Jan. 11, 2005

(65) Prior Publication Data

US 2005/0169722 A1    Aug. 4, 2005

(30) Foreign Application Priority Data

Jan. 29, 2004    (DE)    ............ 10 2004 004 498

(51) Int. Cl.
   *B23G 5/08*    (2006.01)
(52) U.S. Cl. ....................... 408/152; 470/80
(58) Field of Classification Search ........... 408/152, 408/153, 158, 168; 470/66, 80; 82/110, 82/113
   See application file for complete search history.

(56) References Cited

U.S. PATENT DOCUMENTS 2,131,965 A * 10/1938 Nell ................ 470/203
2,309,862 A * 2/1943 Nell ................ 408/158
3,645,638 A * 2/1972 Theuerkauf ............ 408/1 R
3,829,920 A * 8/1974 Theuerkauf ............ 470/77
3,992,123 A * 11/1976 Uyetake et al. ........... 408/104
4,626,149 A * 12/1986 Holy et al. ............ 409/191
5,662,524 A * 9/1997 Esser et al. ............ 470/190
6,062,777 A * 5/2000 Palyo et al. ............ 408/1 R

FOREIGN PATENT DOCUMENTS

DE    44 38 818    5/1996
DE    101 33 856    1/2003
JP    08206921 A * 8/1996

* cited by examiner

Primary Examiner—Monica Carter
Assistant Examiner—Eric A. Gates
(74) Attorney, Agent, or Firm—Andrew Wilford

(57) ABSTRACT

A thread cutter for pipe ends has a tool head rotating coaxially with respect to a fixedly clamped pipe end and provided at tool holders in the form of radial sliders. Actuators which are parallel to the rotation axis are mounted on a frame shiftable with respect to the head for synchronously radially displacing the sliders and gears mesh with racks of neighboring sliders. The gears are formed with an integrated centrifugal force balancing system.

5 Claims, 3 Drawing Sheets

APPARATUS FOR MACHINING PIPE ENDS, ESPECIALLY FOR CUTTING CONNECTING THREADS

FIELD OF THE INVENTION

The present invention relates to an apparatus for machining the ends of pipes, especially for cutting screw threads thereon, to enable the coupling of such pipes together either directly or through threaded couplings or other fittings.

BACKGROUND OF THE INVENTION

For the cutting of screw threads on the ends of pipes, a threading machine can be used which has a tool head into which the pipe can be inserted or which can be moved over the pipe end when the latter is in position. That tool head can carry a number of thread-cutting tools which can be shifted radially relative to the pipe on the tool holders forming radial slides. The tool holders and tools are generally uniformly spaced angularly about the axis of the tool heat and the pipe, i.e. the tool head and the pipe can be coaxial.

Appropriate actuating or displacement means can be provided on the tool head to shift the slides. Coaxial with the tool head or disposed along a common axis therewith can be a frame located on the side of the tool head turned toward the opposite end of the pipe from that being threaded and which can be coupled by the actuators on the tool head to the sliders or tool holders to insure a synchronous displacement of the sliders. The actuators can be, for example, rods or bars connected at one end to the frame and formed at their ends within the tool head with inclined teeth which actuate the rack and pinion systems which drive and couple the frame and rods to the sliders and hence the cutting tools.

An apparatus of this type has been described and illustrated in German patent document DE 44 38 818 A1.

The pipe thread is, as a rule, cut in a single pass of the tool head over the pipe end and the movement of the cutting tools and the head is generally controlled by a numerical control system. The machine is so configured that especially narrow or tight thread tolerances can be achieved. It is especially significant with such machines that the tool head itself is rotatable while the pipe is held stationary. In practice, as soon as the pipe is positioned at a particular location within the machine, the thread cutting advance of the tool head is effected.

The cutting tools, as has been noted, are uniformly angularly spaced on the cutting head and, while the number of cutting tools is optional, in the most common case six tools are provided, three of which are spaced angularly at 120° intervals while the other three, also spaced at 120° intervals are offset from the first, the two sets of tools being synchronized to move oppositely. This can be achieved by a central gear which meshes with the racks of the sliders formed by the tool holders.

At high rotary speeds of the tool head, which can reach 1000 rpm, the centrifugal force at the movable masses or components is very high and acts counter to the forces which must radially advance the cutting tools, thereby complicating the exact positioning of the tools. The gears which mesh with the racks of the sliders are configured as spur gears and serve in part to balance the centrifugal forces. A complete centrifugal force compensation, however, is achieved with this earlier system only when the sliders are in their central positions, i.e. in an intermediate position between extreme radial positions.

In order to provide a compensation for the centrifugal force when the sliders because of radial adjustment no longer are all at exactly the same radial spacing from the rotation axis and thus such that the centrifugal force does not act equally upon all of the sliders and cannot be balanced by identical positioning of the sliders, an additional centrifugal force balance system has been disclosed in the German Patent Document DE 101 33 856 A1. This compensating system is comprised of lobar balancing weights with toothed segments meshing with a gear that in turn meshes with the rack of a first slider. With the lobar balancing weight, however, the counter moment can be applied only through a relatively small swing. Larger differential centrifugal forces at the other sliders which do not have a balancing weight meshing with then through the intermediary of a respective gear can only be compensated through the counter moment at the first slider and at the central gear between the two sliders. In short, the centrifugal force compensation in this system has proved to be inadequate in spite of the additional provision of a balancing weight as described.

OBJECT OF THE INVENTION

It is, therefore, the principal object of the present invention to provide an apparatus for cutting threads on pipe ends whereby the counter balancing of centrifugal forces is improved and drawbacks of prior art systems are eliminated.

Another object of the invention is to provide a device of the type described at the outset in which centrifugal force compensation or balancing can be effective at each slider position.

SUMMARY OF THE INVENTION

These objects and others which will become apparent hereinafter are attained, in accordance with the invention, in an apparatus for machining a pipe especially to provide a coupling thread thereon, which comprises:
  a tool head rotatable about a pipe end and having an axis of rotation;
  a plurality of tool holders angularly equispaced about the axis and radially shiftable on the tool head;
  a respective machining tool engageable with the pipe end and clamped on each of the tool holders;
  a plurality of actuators extending parallel to the axis and displaceable relative to the tool head for shifting the tool holders, the actuators having extremities proximal to the pipe end and extremities remote from the pipe end, the extremities proximal to the pipe end having teeth;
  a frame common to and connected with the actuators at the extremities remote from the pipe end;
  respective racks on the tool holders, at least some of the racks meshing with the teeth of the actuators for radial displacement of the tool holders upon displacement of the actuators parallel to the axis relative to the tool head;
  pinion gears meshing with racks on the tool holders whereby the pinion gears mesh with racks of neighboring tool holders to couple the neighboring tool holders for joint radial movement or are individual to respective tool holders; and
  balancing weights integrated with the pinions and having centers of mass offset from rotation axes thereof.

The objects of the invention are thus achieved in that the gears which are coupled to the racks of the sliders are integrated with respective balancing weights. Since the weight balancing in this system takes place at each location at which the centrifugal force acts in an unbalanced manner, namely, integrated with the gear associated with each of the sliders, the centrifugal force compensation is effective at all positions of each slider and at all possible speeds of the rotating tool head. As the sliders are shifted from their intermediate positions, therefore, no longer is there any differential centrifugal force acting on the respective mass without compensation.

According to a feature of the invention, the gears are provided with counterweights. As a consequence, for a given weight of the slider in every position beyond its intermediate position there will be a centrifugal force compensation by the action of the counterweight coupled thereto through the gear in which the counterweight is integrated automatically and as a result of the force transmitting connection between that gear and the respective slider.

In an embodiment in which each of the sliders is formed with a rack with which an individual gear meshes, i.e. a gear which is individual to that rack and is not coupled to the rack of another slider, the counter weight for that gear is provided on the outer periphery of the gear which lies opposite the segment of the gear which meshes with the rack of that slider. In this case, there is a separate centrifugal force compensation at each slider by an opposite rotary movement on the one hand by a forward movement of the weight and a rearward movement of the slider or conversely a rearward movement of the weight and a forward movement of the slider with the counterweight occupying, for example, a circular segment of 180° while the meshing teeth of the gear engaging the rack lie over is 180° circular segment centered on the center of rotation and on the intermediate position.

In the retracted, outwardly-lying positions of the sliders and thus the greater centrifugal force for a given rotary speed, the counterweights assume their maximum effective positions with respect to the center of rotation and generate a counter movement exactly corresponding to the slider centrifugal force. When, however, the sliders move inwardly with monotonically reducing centrifugal force, the counterweights generate a progressively reduced counter torque corresponding to the change in the counterweight center of gravity.

In an embodiment of the tool head in which neighboring sliders both mesh via their racks with a common gear, i.e. there is a common gear for each two sliders or tool holders, the counterweight lies along a diameter of the gear. The spur gear which then meshes on both sides of this diameter with respective racks is capable of balancing the centrifugal forces on both sliders. The counterweights are then so arranged that, starting from an intermediate or central position of the slider and of the counterweight, a complete balancing of the centrifugal force is obtained when the sliders move counter to one another inwardly or outwardly and generate a greater or lesser centrifugal force. These different centrifugal forces are compensated by the forced rotation of the gear into which the counterweight is integrated by a compensatory shifted in the center of gravity of the counterweight. The torque which is produced by the centrifugal force about the rotational center of this gear thus counteracts the respective increases in the centrifugal force.

In accordance with a preferred feature of the invention, in the embodiment in which a gear meshes with the racks of neighboring sliders, the invention provides that the gears are each associated with a flange or rib of a differential transmission which has a compensating weight on a center gear wheel. The gears are formed advantageously with a housing constituting that element and such that the central gear or wheel is journalled in the housing and a sun gear is provided which has a toothed segment diametrically opposite the compensating weight. With the differential transmission integrated in the gear meshing with the slider rack, in spite of a very small rotation angle of this gear, a comparatively large and indeed many times larger angular adjustment of the compensating weight is possible as a result of the ratio of the differential transmission at the central gear carrying the balancing weight. Thus, the different centrifugal forces at the two sliders can be directly compensated from a common central gear wheel directly. The counterweight or balancing weight, which can have a relatively small mass can therefore suffice to compensate centrifugal forces at greater radial distances to the center of rotation with the counter moment being amplified in effect by the planetary or differential transmission.

This direct compensation enables compensation of centrifugal forces differences practically in all positions of the sliders and at all speeds. As a consequence, the force required to adjust the sliders can be greatly reduced, enabling the sliders to be displaced and positioned with high accuracy.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
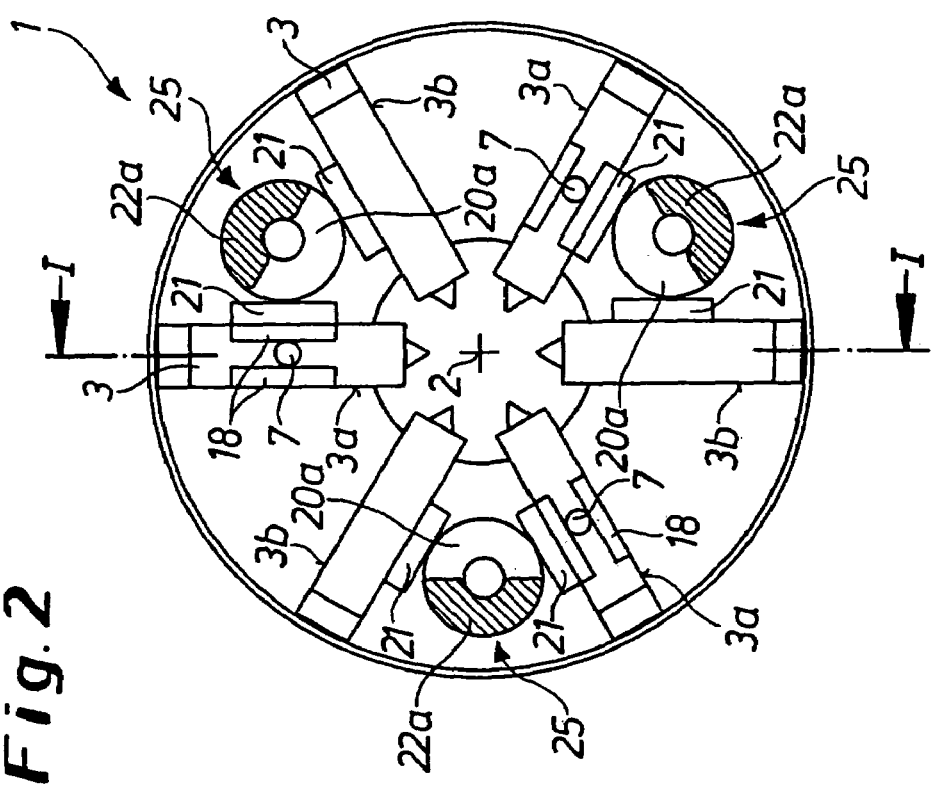
FIG. 2 is a front end view, taken in the direction of an oncoming pipe end of a cutting head with an integrated weight compensation of centrifugal force having gears meshing with two adjoining slider racks.
Figure 1:
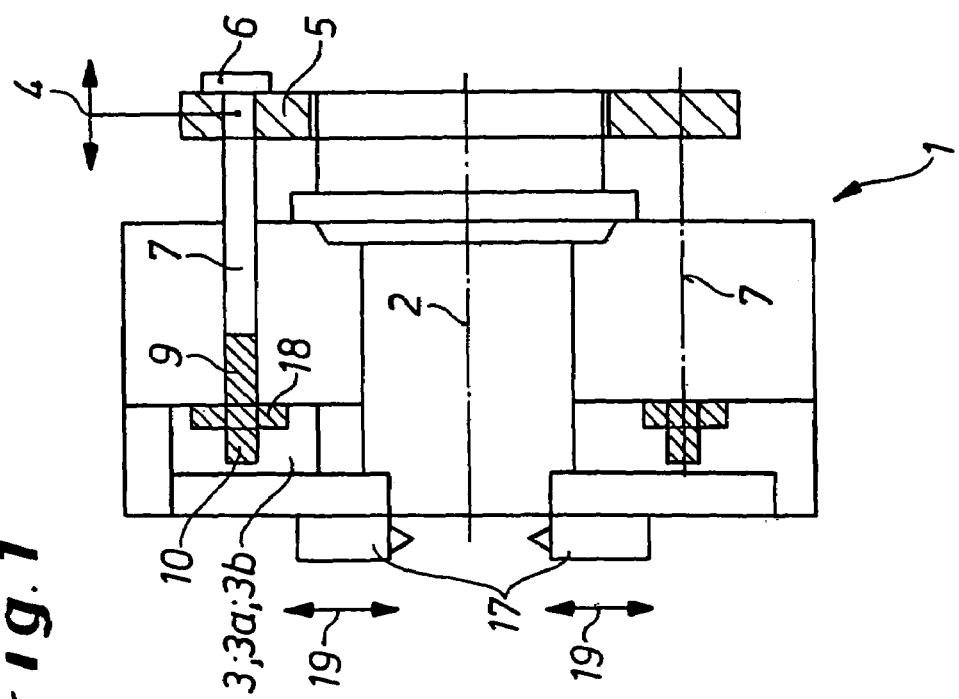
FIG. 1 is a diagrammatic transverse section, substantially as taken along the line I-I of FIG. 2, of a cutting head and its actuating frame have a pipe threading machine otherwise not shown, in accordance with the invention.

The cutting tool head 1 shown in FIGS. 1 and 2 is rotatable about the tool head axis 2 which corresponds to the axis of the pipe end over which that tool head can be axially displaced in order to cut a thread on that end. The tool head is provided with a plurality of angularly equispaced radially shiftable sliders 3, 3a, 3b forming tool holders and provided with, for example, carbide tipped thread cutting tools 17.

Rearwardly of the tool holder body or head 1 is provided a frame 5 which is axially shiftable, i.e. displaceable in the direction shown by the double headed arrow 4, relative to the head, to control the radial positions of the sliders 3, 3a, 3b and hence the depth of penetration of the cutting tool 17 into the pipe end.

A plurality of rods 7, parallel to the axis 2 and shiftable in the axial direction by the frame 5 are fastened at 6 to move synchronously in the longitudinal direction (shown by the double headed arrow 4). The rods 7, at their free ends 9 turned toward the cutting tools 17 are provided with inclined teeth 10 which can act upon complementarily inclined teeth on racks 18 of the sliders 3, 3a, 3b.

As can be seen from FIG. 2, around the tool head 1, three such rods 7 are angularly equispaced as slider actuators. Instead of the linearly displaceable rods 7, the actuators for the racks can be threaded spindles or other kinds of actuators coupled for synchronous movement and serving to convert, for example, displacement of the actuators into radial movement of a respective slider. In the embodiment shown in FIGS. 1 and 2, the three actuating rods 7 are equispaced at 120° apart and extend through the sliders 3 and 3a to mesh with racks 18 flanking the respective rod 7 on each side. Threaded spindles can engage gears which drive racks on flanks of the sliders. In any event, the sliders are displaceable toward and away from the workpiece in the direction represented by the double headed arrows 19 in FIG. 1.

For complete balancing or compensation of the centrifugal force in all positions deviating from the intermediate positions of the tools 17 and the sliders 3, 3a, 3b which have been shown in FIG. 1, between neighboring sliders 3a and 3b (the slides 3b being free from individual actuators 7) central gear wheels 20a are provided to mesh with racks 21 along the sides of the sliders 3a, 3b or 3, 3b which are coupled together by the gears 20a. The gears 20a have integrated in the gears, respective balancing weights collectively represented by the reference character 25 and formed by the semicircular segments or counterweights 22a. In operation, the sliders 3a are moved inwardly toward the workpiece and the sliders 3b are moved outwardly by corresponding amounts simultaneously (or vice versa) so that the counter movements of alternating sliders radially, together with the corresponding swing of each of the counterweights 22a located along only one side of the respective gear 20a can completely balance even very large centrifugal forces in all positions of the sliders.

Figure 4:
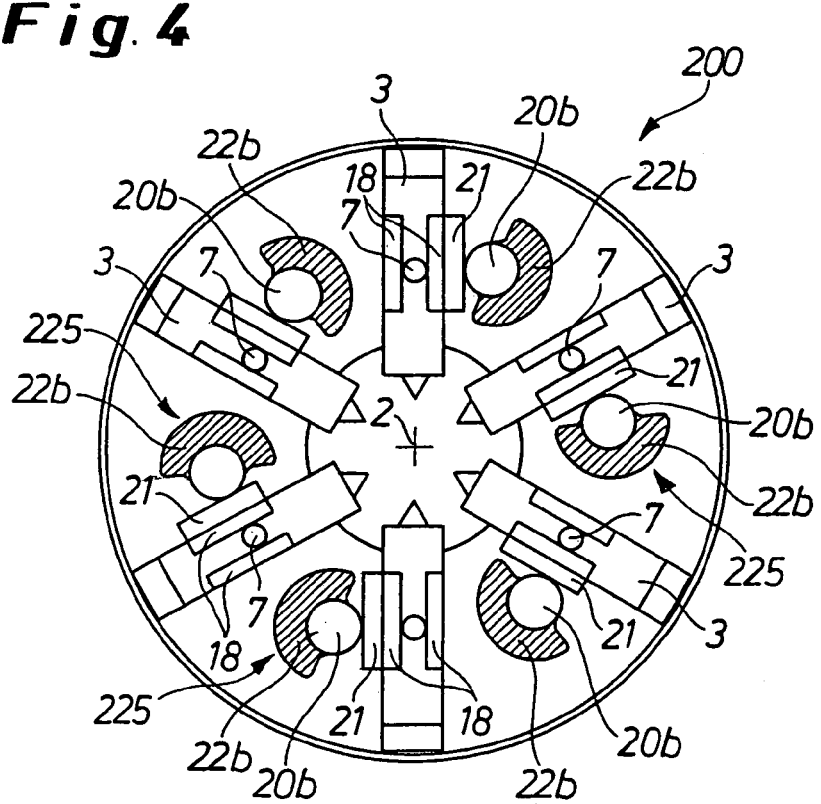
FIG. 4 is another diagrammatic front end view of an embodiment wherein each of the tool-carrying sliders is provided with a gear having a counterweight integrated therewith and individual to that slider or tool.

A further embodiment operating in accordance with generally the same principle has been shown in FIG. 4 in which the tool head 200 has not only the three inwardly moving but also the three outwardly moving sliders provided with respective linear actuators 7 (or alternatively threaded spindles) with the tooth orientations (or thread sense) such that as the frame 5 moves in one direction, three of the sliders 3 will move inwardly while the other three will synchronously move outwardly as in FIGS. 1 and 2. In this embodiment, however, each of the six sliders 3 has a separate gear 20b in which the counterweight 22b is integrated and meshing with a respective rack 21 individual to the respective slider 3. The counterweights 22b form an integrated balancing compensating system 225 for the centrifugal force.

In this embodiment, moreover, each counterweight 22b is a semicircular segment like member on half the gear 20b. Although not coupled by gearing, each inwardly moving slider 3 is paired with an inwardly moving slider as in the embodiment of FIGS. 1 and 2.

The counterweights 22b located on one side of the respective gear generate a correspondingly reduced counter torque as the centrifugal force decreases for the inwardly moving sliders 3 and an increasing counter torque as the sliders move outwardly to increase the centrifugal force toward the outer most slider positions at which the greatest centrifugal applies.

Figure 3:
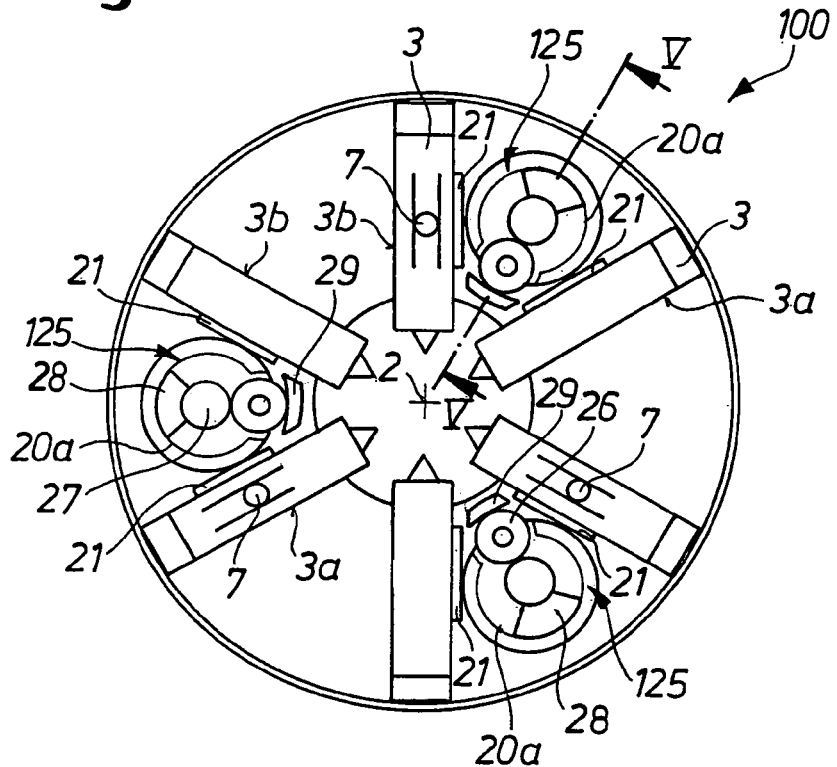
FIG. 3 is a front view similar to FIG. 2 of a tool head with neighboring slider racks engaged by the toothed housing of respective differential drives and coupled with the integrated counter weighted gear by the differential or planetary transmissions.
Figure 5:
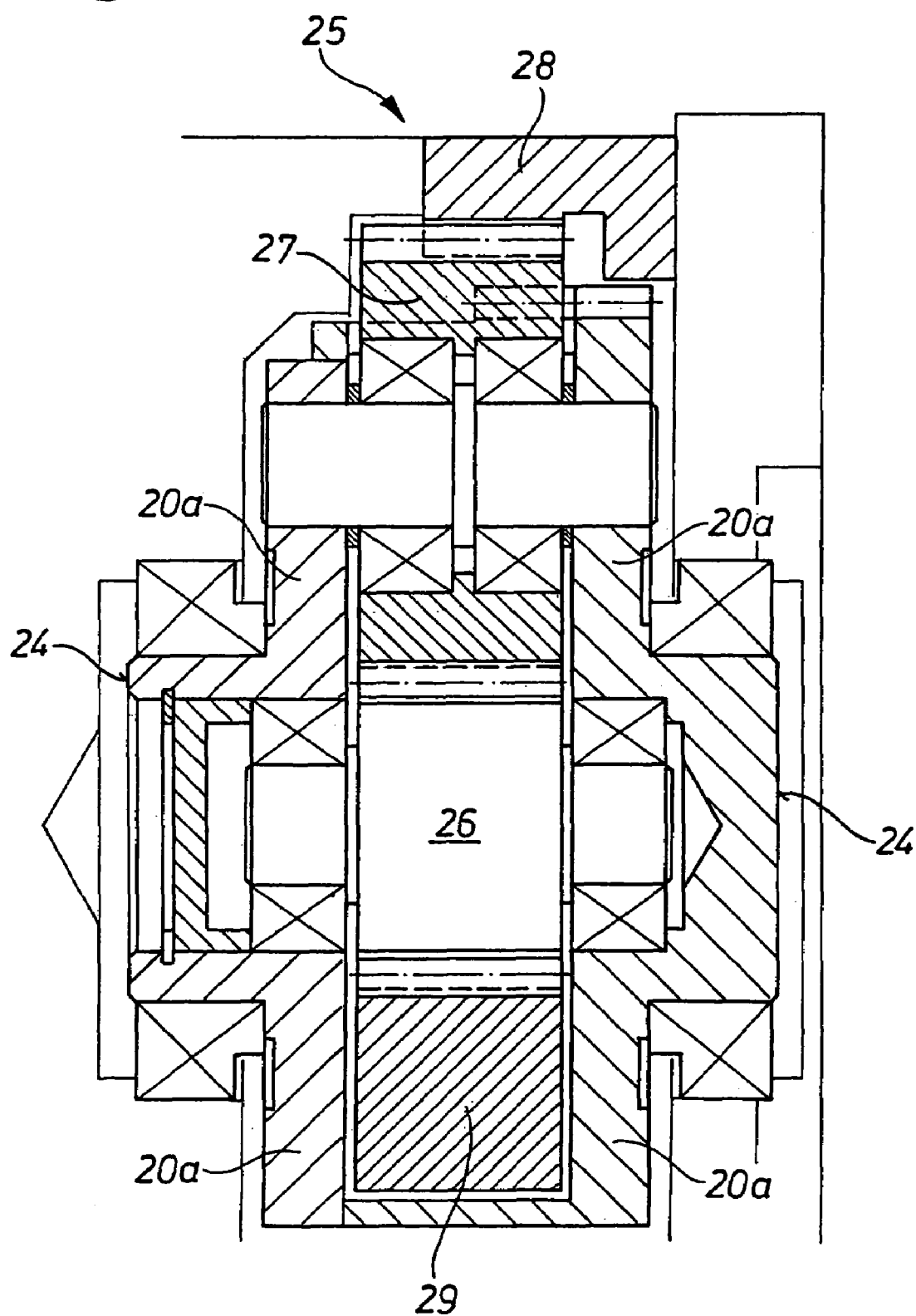
FIG. 5 is a cross sectional view taken along the line V-V of FIG. 3.

In the embodiment of FIG. 3, the tool head 100, as in the embodiment of FIG. 2, has central gear wheels or spur wheels 20a which couple the pairs of the sliders 3, 3a, 3b together with the respective racks 21. However, the integrated weight balancing system 125 of this embodiment differs from that of FIG. 2 in that the gears 20a have differential transmissions 23 built into them as can be seen in greater detail in FIG. 5. In this case, the gears 20a are ribs of a differential transmission housing 24. In the housing 24 and the gear 20a of a differential transmission, a central gear 26 is provided to mesh with a sungear 27 that in turn meshes with a gear segment 28. The segment 28 lies diametrically opposite the central gear 26 of the transmission 23 and has a counterweight 29 affixed thereto.

The differential transmissions 23 integrated in the gears 20a enable the generation of a centrifugal force with a greater radius than may be obtainable by a counterweight on that gear directly. The transmission ratio can amplify the counter torque which can balance the centrifugal forces on each position of the two sliders 3a, 3b coupled by that differential transmission.

I claim:

1. An apparatus for machining a pipe end, the apparatus comprising:

a tool head rotatable about a pipe end and having an axis of rotation;

a plurality of tool holders angularly equispaced about the axis and radially shiftable on the tool head;

a respective machining tool engageable with the pipe end and clamped on each of the tool holders;

a plurality of actuators extending parallel to the axis and displaceable relative to the tool head for shifting the tool holders radially on the tool head, the actuators having extremities proximal to the pipe end and extremities remote from the pipe end, the extremities proximal to the pipe end having teeth;

a frame common to and connected with the actuators at the extremities remote from the pipe end;

a plurality of first racks each on a respective one of the tool holders and meshing with the teeth of the respective actuators for radial displacement of the tool holders upon displacement of the actuators parallel to the axis relative to the tool head;

respective second racks extending radially and fixed on the tool holders;

pinion gears rotatable about pinion rotation axes parallel to the axis of rotation of the head and meshing directly with the second racks on the tool holders; and balancing weights formed directly on the pinion gears and having centers of mass offset from the respective pinion rotation axes, the balancing weight of each pinion gear lying between a diameter of the respective pinion gear and an outer periphery of the respective pinion gear.

2. The apparatus defined in claim 1 wherein each pinion gear meshes at a respective peripheral region with a respective tool holder and the respective balancing weight is formed on the respective pinion gear diametrically opposite the respective peripheral region.

3. The apparatus defined in claim 1 wherein the balancing weights are circular segments on the respective pinion gears.

4. An apparatus for machining a pipe end comprising:

a tool head rotatable about a pipe end and having an axis of rotation;

a plurality of tool holders angularly equispaced about said axis and radially shiftable on said tool head;

a respective machining tool engageable with the pipe end and clamped on each of said tool holders;

a plurality of actuators extending parallel to said axis and displaceable relative to said tool head for shifting said tool holders, said actuators having extremities proximal to said pipe end and extremities remote from said pipe end, said extremities proximal to said pipe end having teeth;

a frame common to and connected with said actuators at said extremities remote from said pipe end;

respective racks on said tool holders, at least some of said racks meshing with the teeth of said actuators for radial displacement of said tool holders upon displacement of said actuators parallel to said axis relative to said tool head;

pinion gears meshing with racks on said tool holders whereby said pinion gears mesh with racks of neighboring tool holders to couple the neighboring tool holders for joint radial movement or are individual to respective tool holders; and balancing weights integrated with said pinion gears and having centers of mass offset from rotation axes thereof, each of said pinion gears being formed on a differential transmission housing provided with the balancing weight connected with the respective housing by gearing with a transmission ratio.

5. The apparatus defined in claim 4 wherein each differential transmission has a central gear meshing with a sun gear, a tooth segment meshing with said sun gear and the respective balancing weight is diametrically opposite said tooth segment.

* * * * *